Patented Apr. 8, 1930

1,753,641

UNITED STATES PATENT OFFICE

JOHN W. BECKMAN, OF OAKLAND, CALIFORNIA

METHOD OF BREAKING EMULSIONS

No Drawing.      Application filed December 21, 1925.  Serial No. 76,899.

My process is particularly applicable to the de-emulsifying of oils, such as the breaking of emulsions of mineral oils and especially of crude petroleum oils as found in nature.

It is a further object of my invention to also effect an action upon the oil whereby its physical qualities are improved, the quality or grade of oil which is separated out by my process being superior, due to chemical changes which take place in the oil during the action on the emulsion, treated according to my method.

The crude petroleum derived from many oil wells is found to contain material percentages of water so that the produce is in fact an emulsion and usually of an extremely persistent or tenacious type difficult to break or separate. It is known as a stable emulsion between two immiscible liquids and its stability or resistance to breaking is generally considered to be caused by the presence of a third substance known as an emulsifying agent.

All stable emulsions appear to be characterized by the presence of such an emulsifying agent and in order to separate the principal ingredients such as oil and water, the removal as such, or the destruction of the emulsifying agent enables the separated particles of each of the liquids to flow together or agglomerate into larger masses which, due to the well understood gravity action on larger masses, results in the ready separation of the immiscible liquids; and in the case of oil and water the floating of the oil on top of a layer of water.

Various substances may act as emulsifying agents and nitrogen containing substances are particularly effective in restraining the separation and therefore the emulsion of immiscible liquids.

These objects I attain by treating the emulsion with micro-organisms which attack and alter or destroy the emulsifying agent as such and therefore effect a release of the bond holding separated the immiscible liquids forming the said emulsion.

Various micro-organisms may be utilized for this purpose, such as bacteria, moulds, and/or yeast, and their action, and the action of the enzymes produced during their life processes, effect a chemical destruction of the molecular structure of the emulsifying agent and its resolution into a compound or compounds of less molecular complexity.

The destruction of such a molecule of the emulsifying agent therefore breaks the said link or tie, enabling the agglomeration of particles and a separation between the liquids to rapidly follow, due to their different specific gravities.

I have found that by the action of the micro-organisms the molecule of the emulsifying agent is destroyed or altered with respect to its tying or linking properties between the liquids with the result that rapid separation follows.

In practicing my process I provide a media adapted to facilitate the propagation of the micro-organism, and which media includes food for the selected organism or organisms with water to facilitate the physical transfer of the organisms through the mass and to contribute to their life growth. This inoculated median I bring in contact with every particle of the emulsion so that all particles or molecules of the emulsifying agent are exposed to the action of the organisms and destruction of the said agent is thereby accomplished through the action of the organism directly upon the said chemical constituent or agent, the organisms in effect feeding also upon such agent.

In this way I am able to destroy the emulsifying agent whether it consists of nitrogen compounds, phosphates, nitrates, carbonates, sulphur compounds, or any other of the substances which have this emulsion producing and retaining function.

The media employed may consist of a watery mixture containing also nitrogen bearing substances as peptones, fish and meat scrap extracts, either before or after a lactic fermentation, and I have found that seed cakes, such as copra meal, linseed, and cottonseed cakes, which have had a prior lactic acid fermentation and have a high and soluble protein content in the form of amino acids are eminently well fitted for this purpose.

Mineral salts may advantageously be added in varying proportions, depending upon the emulsifying agent which it is wished to destroy.

The media to be chosen is to be such a mixture when taken with the emulsifying agent as will best facilitate the growth of the organisms.

If bacteria are used for the action on the emulsifying agent, a neutral media should be used, whereas if moulds are used for their growth, an acid media is preferable.

As an example of neutral media having a hydrogen ion concentration of 7. I have found the following when inoculated, to be well adapted for the destruction of the emulsifying agent:

| | Grams |
|---|---|
| Sodium potassium tartrate | 5. |
| Peptone | 1. |
| Dibasic potassium phosphate | .5 |
| Magnesium sulphate | .2 |
| Agar | 15. |
| Distilled water | 1000 |

For an acid media to facilitate the growth of moulds, where these are employed in the practice of my process, I have found a media having a hydrogen ion concentration of 4. and consisting of the following to be well adapted:

| | Grams |
|---|---|
| Glucose | 10 |
| Peptone | 5 |
| $MgSO_4.7H_2O$ | 5 |
| $KH_2PO_4$ | 1 |
| Distilled water | 1000 |

Having selected the micro organism which it is desired to employ and a suitable media for the growth of said organism, the media is inoculated and introduced into or with the emulsion to be treated and the mass is now to be agitated from time to time to insure mixing and contacting of the organisms with the particles of the emulsifying agent and it is to be maintained at a temperature of substantially from 20° to 40° C. preferably under atmospheric pressure, for a period of substantially 15 days or until the organisms have completed their action upon the emulsifying agent.

During this treatment the oil will continue to separate from the water and when treatment is completed a distinct layer of oil will be found to be floating upon the water.

As an example of my process, I take a crude oil emulsion containing 17% of water which it is desired to separate out.

I then make a feeding media with some copra meal to which is added 10% of calcium carbonate and a sufficient amount of water to produce a thick creamy mixture, and this I inoculate with lactic acid bacteria.

The total volume of this inoculated mixture is approximately 100 cc. and I pour approximately one liter of the crude oil emulsion on top of this inoculated media. The vessel containing the media and crude oil emulsion is now allowed to stand, at room temperature, for substantially two weeks with occasional agitation after which the water settles out of the oil and upon test, I have found that the oil so treated now only contained a trace of water. The original 17% of water present in the oil, as an emulsion, makes impossible its refinement until by some other means the water content has been brought to less than 2%. This my process has accomplished.

In using the term hydrocarbons as descriptive of the class of substances to which my invention is particularly directed, I wish to be understood as not limiting myself to a narrow chemical definition of hydrocarbons but to include therein oils and oily substances.

I claim:

1. The method of de-emulsifying a water-in-petroleum oil emulsion containing an emulsifying agent which consists of exposing said mixture to the action of living micro organisms adapted to destroy said agent as such.

2. The method of altering the chemical structure of an emulsifying agent present in an emulsion of water-in-petroleum oil which consists of exposing every particle of the said agent to the action of a medium containing and supporting living micro organisms adapted to destroy said agent as such.

3. The method of de-emulsifying a water-in-petroleum oil emulsion containing an emulsifying agent which consists of treating the said mixture with micro organisms adapted to destroy said agent and a life sustaining medium for said organisms.

4. The method of de-emulsifying a water-in-petroleum oil emulsion containing an emulsifying agent which consists of treating the said mixture with micro organisms adapted to destroy said agent and a life sustaining medium for said organisms, while retaining said mixture at a temperature between 20° and 40° C.

5. The method of de-emulsifying a water-in-petroleum oil emulsion containing an emulsifying agent which consists of treating the said mixture with a life sustaining medium inoculated with micro organisms adapted to destroy said agent as such, until the life action on the mixture has substantially ceased, and agitating said mixture at intervals during said life action.

6. The method of breaking natural crude petroleum oil emulsion having an emulsifying agent which consists of treating the same with a medium adapted to sustain the life of and inoculated with micro organisms adapted to destroy said agent as such.

7. The method of breaking natural crude petroleum oil emulsion having an emulsifying agent which consists of treating the same with a medium adapted to sustain the life of and inoculated with micro organisms adapted to destroy said agent as such while retaining said mixture at a temperature between 20° and 40° C. whereby the oil is caused to separate from the water.

8. The method of breaking natural crude petroleum oil emulsion having an emulsifying agent which consists of treating the same with a medium adapted to sustain the life of and inoculated with micro organisms adapted to destroy said agent as such until the life action on the mixture has substantially ceased, and agitating said mixture at intervals during said life action, whereby the oil is caused to separate from the water.

JOHN W. BECKMAN.